(12) United States Patent
Jüngling et al.

(10) Patent No.: US 11,390,150 B2
(45) Date of Patent: Jul. 19, 2022

(54) SUPPORT MECHANISM FOR AN OPEN-ROOF ASSEMBLY IN A VEHICLE ROOF

(71) Applicant: Inalfa Roof Systems Group B.V., Oostrum (NL)

(72) Inventors: Rainer Gerhard Jüngling, Mönchengladbach (DE); Marcel Johan Christiaan Nellen, Merselo (NL)

(73) Assignee: Inalfa Roof Systems Group B.V., Oostrum (NL)

( * ) Notice: Subject to any disclaimer, the term of this patent is extended or adjusted under 35 U.S.C. 154(b) by 0 days.

(21) Appl. No.: 17/024,355

(22) Filed: Sep. 17, 2020

(65) Prior Publication Data
US 2021/0086596 A1    Mar. 25, 2021

(30) Foreign Application Priority Data

Sep. 19, 2019 (EP) .................................. 19198404

(51) Int. Cl.
*B60J 7/22* (2006.01)
*B60J 7/043* (2006.01)
(Continued)

(52) U.S. Cl.
CPC ............... *B60J 7/043* (2013.01); *B60J 7/057* (2013.01); *B60J 7/0435* (2013.01); *B60J 7/05* (2013.01); *B60J 7/053* (2013.01); *B60J 7/22* (2013.01)

(58) Field of Classification Search
USPC ............ 296/216.01, 216.02, 216.03, 216.04, 296/216.05, 216.08, 221, 222, 223
See application file for complete search history.

(56) References Cited

U.S. PATENT DOCUMENTS

| 7,258,397 B2 | 8/2007 | Braun et al. |
| 8,182,029 B2 | 5/2012 | Van Boxtel et al. |
(Continued)

FOREIGN PATENT DOCUMENTS

| CN | 101961976 A | 2/2011 |
| CN | 103786558 A | 5/2014 |
(Continued)

OTHER PUBLICATIONS

European Search Report and Written Opinion in corresponding European Patent Application No. 19198404.6, dated Mar. 16, 2020.

*Primary Examiner* — Dennis H Pedder
*Assistant Examiner* — Joyce Eileen Hill
(74) *Attorney, Agent, or Firm* — Steven M. Koehler; Westman, Champlin & Koehler, P. A.

(57) ABSTRACT

A support mechanism for an open-roof assembly, comprising a moveable panel, comprises at least one of a front flexible portion and a rear flexible portion. A guide assembly of the open-roof assembly comprises an elongated guide rail extending in a longitudinal direction, a front mechanism slideably arranged in the guide rail and a rear mechanism arranged in the guide rail. The front mechanism and the rear mechanism are provided with means for providing a relatively high mechanism stiffness, while the at least one of the front and rear flexible portions is provided with a relatively low bending stiffness in the width direction and with a relatively low rotational stiffness in respective main directions such that orientation deviations between the panel support assembly and the guide assembly result in larger rotational deformation in the at least one of the respective flexible portions than in the respective mechanisms.

23 Claims, 7 Drawing Sheets

(51) Int. Cl.
*B60J 7/05* (2006.01)
*B60J 7/053* (2006.01)
*B60J 7/057* (2006.01)

(56) References Cited

U.S. PATENT DOCUMENTS

| | | |
|---|---|---|
| 8,991,911 B2 | 3/2015 | Nabuurs et al. |
| 9,931,919 B2 | 4/2018 | Nellen et al. |
| 2004/0222675 A1 | 11/2004 | Oberheide |
| 2006/0082193 A1 | 4/2006 | Braun et al. |
| 2009/0021056 A1* | 1/2009 | Manders ............ B60J 7/05 |
| | | 296/221 |
| 2010/0314913 A1 | 12/2010 | Van Boxtel et al. |
| 2012/0235448 A1 | 9/2012 | Grimm et al. |
| 2014/0175840 A1 | 6/2014 | Nabuurs et al. |
| 2017/0151863 A1 | 6/2017 | Nellen et al. |
| 2018/0215242 A1 | 8/2018 | Heidan |

FOREIGN PATENT DOCUMENTS

| | | |
|---|---|---|
| CN | 101961976 B | 2/2015 |
| CN | 103786558 B | 5/2017 |
| CN | 206436797 U | 8/2017 |
| DE | 102005007031 A1 | 8/2006 |
| EP | 2263897 A1 | 12/2010 |
| EP | 2263897 B1 | 5/2012 |
| EP | 2727755 A1 | 5/2014 |
| EP | 2727755 B1 | 10/2015 |
| EP | 3173271 A1 | 5/2017 |
| EP | 3173271 B1 | 7/2018 |
| JP | 2014088169 A | 5/2014 |
| JP | 6366922 B2 | 8/2018 |
| KR | 20140055999 A | 5/2014 |

* cited by examiner

SUPPORT MECHANISM FOR AN OPEN-ROOF ASSEMBLY IN A VEHICLE ROOF

BACKGROUND

The discussion below is merely provided for general background information and is not intended to be used as an aid in determining the scope of the claimed subject matter.

The invention relates to a support mechanism for an open-roof assembly for use in a vehicle roof and in particular to a support mechanism for supporting a moveable panel, wherein the moveable panel is configured for closing an opening in the vehicle roof.

Open-roof assemblies for use in a vehicle roof are commonly known. For example, a glass plate-like closure member may be moveably provided over an opening in the vehicle roof. The closure member may be tilted to provide for a tilted position, e.g. suitable for ventilation purposes, wherein a rear side edge portion of the closure member is tilted out of a plane of the vehicle roof. From the tilted position, the closure member may be slid over another part of the vehicle roof, uncovering the opening in the roof.

A number of mechanism types are known for providing the above-described movement of the closure member. In a first kind of mechanism, a rear mechanism is provided to first tilt the rear side edge portion and to slide with the closure member, thereby supporting the rear side edge portion of the closure member also when the closure member is slid open and is positioned over the other part of the vehicle roof. In a second kind of mechanism, the rear mechanism is configured to tilt the rear side edge portion, after which the rear mechanism remains in its position and the closure member slides relative to the rear mechanism, while sliding over the other part of the vehicle roof.

The open-roof assemblies are usually manufactured separately on an open-roof frame and the open-roof assembly is later mounted on a vehicle body during manufacturing of the vehicle. Due to e.g. manufacturing tolerances, when mounted on the vehicle body, the support mechanism may be slanted relative to its intended orientation relative to the closure member. While such slanted mounting may be easily compensated in the mechanism by design of the mechanism for the above-mentioned first kind of open-roof assembly, in the second kind of open-roof assembly, the slanted mounting and orientation may easily result in excessive tension in a number of parts of the mechanism and may thus result in the mechanism not moving smoothly anymore with e.g. heavy running or undesirable noises as a consequence.

A support mechanism for an open-roof assembly of the above-mentioned second kind that is less sensitive to a slanted orientation relative to the closure member would be desired.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A support mechanism is configured for use in an open-roof assembly in a vehicle roof, wherein the vehicle roof extends in a roof plane. The roof plane extends in a longitudinal direction and a width direction, the width direction being perpendicular to the longitudinal direction. The open-roof assembly comprises a moveable panel for closing an opening in the vehicle roof. The support mechanism comprises a panel support assembly and a guide assembly. The panel support assembly comprises a panel mounting portion; a front support portion fixedly coupled to the panel mounting portion, comprising a front coupling portion; and a rear support portion slideably coupled to the panel mounting portion, comprising a rear coupling portion. The guide assembly comprises an elongated guide rail extending in the longitudinal direction; a front mechanism slideably arranged in the guide rail and comprising a front hinge, the front coupling portion being coupled to the front hinge; a rear mechanism arranged in the guide rail and comprising a rear hinge, the rear coupling portion being coupled to the rear hinge. The front mechanism and the rear mechanism are provided with means for providing a relatively high mechanism stiffness. The panel support assembly comprises at least one flexible portion selected from a front flexible portion and a rear flexible portion. The front flexible portion is comprised in the front support portion and extends in a front main direction, the main direction extending from the front coupling portion to the panel mounting portion and the rear flexible portion is comprised in the rear support portion and extends in a rear main direction, the rear main direction extending from the rear coupling portion to the panel mounting portion. The flexible portion is provided with a relatively low bending stiffness in the width direction and with a relatively low rotational stiffness in the respective main directions such that orientation deviations between the panel support assembly and the guide assembly result in larger rotational deformation in at least one of the respective flexible portions than in the respective mechanisms.

The mechanism is provided with a flexible portion between at least one of the front mechanism and the rear mechanism on the one hand and the panel mounting portion on the other hand. The panel mounting portion is configured to be coupled to the closure member. The closure member is commonly a stiff element and is unable to deform. The front mechanism and the rear mechanism are designed and configured to move and thus have inevitably capability to deform. Deformation of such a mechanism is however undesirable in view of smooth running. Therefore, a flexible portion is provided between at least one of the front and the rear mechanisms and the panel mounting portion such that the flexible portion deforms instead of at least one of the mechanisms.

In order to ensure proper stability, the flexibility is limited with respect to certain directions. In particular, the stability in a direction perpendicular to the roof plane should be sufficient to support the closure member in all relevant conditions. The flexibility in the width direction may be increased, i.e. a stiffness may be suitably selected to be relatively low, to allow for adaptation to an orientation deviation between the closure member and the guide assembly. Similarly, a rotational stiffness in a direction parallel to a direction in which the flexible portion extends, i.e. the respective main directions as above mentioned, may as well be selected relatively low. Suitable flexibility in these directions allow to suitably reduce tension in and deformation of the respective mechanisms.

As used herein, a relatively low stiffness in a particular direction or of a particular element is to be considered relative to the relatively high stiffness of another direction or of another element, respectively. In other words, a relatively low stiffness is intended to mean that the stiffness is lower than another, relatively high stiffness. A relatively low stiffness compared to a relatively high stiffness is provided such that upon application of a force any deformation in the support mechanism occurs more at the location of the relatively low stiffness and less at the location of the relatively high stiffness. In particular, it is intended that a difference in stiffness between the relatively low stiffness and the relatively high stiffness is substantial such that any deformation occurs mainly at the location of the relatively low stiffness, although inevitably some minor deformation will occur as well at the location of the relatively high stiffness, wherein a minor deformation is intended to mean a deformation that does not affect smooth running of the support mechanism. As used herein, a relatively low or a relatively high stiffness does not refer to any absolute value of the stiffness.

It should be noted, as used herein, a relatively low stiffness at least has a stiffness that is lower than a relatively high stiffness irrespective of the meaning of "relatively low" and "relatively high". So stated yet another way, a stiffness in a particular direction or of a particular element is to be considered relative to the stiffness of another direction or of another element, respectively. In other words, a lower stiffness is intended to mean that the stiffness is lower than another stiffness. A lower stiffness compared to another stiffness is provided such that upon application of a force any deformation in the support mechanism occurs more at the location of the lower stiffness and less at the location of said another stiffness. In particular, it is intended that a difference in stiffness between the lower stiffness and said another stiffness is substantial such that any deformation occurs mainly at the location of the lower stiffness, although inevitably some minor deformation will occur as well at the location of said another stiffness, wherein a minor deformation is intended to mean a deformation that does not affect smooth running of the support mechanism. As used herein, a lower stiffness does not refer to any absolute value of the stiffness.

A potential further advantage of the flexible portion relates to crash safety. In case of a crash of the vehicle, a large inertia force is exerted on the moveable panel. For example, the inertia force may be up to 50 G, i.e. 50 times the gravitational force. For safety, it is preferred—and commonly even required—that the moveable panel cannot break loose, even under such high force. Thereto, a flexible portion in either one of the mechanisms, preferably a front flexible portion, is provided with such a stiffness that the flexible portion deforms under increasing inertia forces before any part of the open roof assembly and in particular any part of the support mechanism breaks. Moreover, providing a flexible portion as a portion having a lower stiffness than other parts or mechanisms enables to—on the one hand—design a method of absorbing crash forces in a predetermined way and—on the other hand—providing an increased stiffness in predetermined parts without jeopardizing the overall crash safety.

In an embodiment of the support mechanism, the front mechanism comprises a first and a second slide shoe and the guide rail comprises a first guide channel and a second guide channel, the second guide channel opposing the first guide channel. The first slide shoe is slideably arranged in the first guide channel and the second slide shoe is slideably arranged in the second guide channel. Stability and a suitable overall stiffness of the front mechanism may thus be provided. In general, within the conceptual intent of the invention, a ratio of stiffness of the front mechanism and the stiffness of the flexible portion is to be designed such that deformation due to an orientation deviation of the guide assembly is mainly absorbed in the front flexible portion. Of course, the same applies to the rear mechanism and the rear flexible portion, mutatis mutandis.

In an embodiment of the support mechanism, the front hinge comprises a U-shaped portion comprising a base and two legs extending from the base, wherein an axle is supported by the two legs. Further, the front coupling portion comprises a through hole. The front coupling portion is at least partially arranged between the two legs and the axle is arranged through the through hole for hingedly supporting the panel support assembly. A simple and stable arrangement of the front mechanism and its coupling to the front coupling portion is thus provided.

In a particular embodiment, the panel mounting portion, the front flexible portion and the front coupling portion are formed by a single element, preferably an integral part formed from a single unitary body. The single element comprises a plate-like base part, wherein a plane of the plate-like base part extends substantially perpendicular to the roof plane. The panel mounting portion comprises means for increasing a bending stiffness in the width direction and wherein the front flexible portion lacks means for increasing a bending stiffness in the width direction. Such means or structure for increasing a bending stiffness in the width direction may, for example, be a flange, e.g. provided by bending an edge portion of the plate-like base part. Other means or structure for increasing a stiffness comprise an added rib, increased dimensions like an increased thickness, a selected material, for example. Other measures for increasing a stiffness are contemplated as well and are apparent to those skilled in the art. It is noted that use of these means is not limited to use in this particular embodiment. These means are also suitable for use in any other embodiment. Moreover, if the panel mounting portion, the front flexible portion and the front coupling portion are not formed by a single element, the means may also comprise adding and mechanically coupling additional elements, for example, adding elements that increase the width (or portion thereof) of the panel mounting portion over the width of the front flexible portion or the front coupling portion. Similarly, for obtaining a relatively low stiffness, or a lower stiffness, means for decreasing the stiffness may be applied as well. Such means for decreasing a stiffness are also well known to the skilled person and include reducing a dimension, providing a recess or providing a through-hole, for example. In order to adapt stiffness in different directions at a single location, both means for increasing and means for decreasing a stiffness may be applied at such location.

In an embodiment, the rear mechanism comprises a first curve track and a second curve track and a first lever comprising a first pin and a second pin, wherein the first pin is arranged in and guided through the first curve track and the second pin is arranged in and guided through the second curve track, and the first curve track and the second curve track are spaced apart in a direction perpendicular to the roof plane. Thus, by suitably moving the first lever along the first and second curve tracks, an orientation of the first lever may be easily and suitably controlled. In particular, the first lever may be directly connected to the rear hinge such that the first lever may be rotated upward, when moving along the curve tracks, for tilting a rear side edge portion of the closure member.

In an embodiment, the rear support portion further comprises a slide pad for slideably supporting the panel mounting portion. In this embodiment, the slide pad is coupled to the rear flexible portion by a support hinge, wherein a second lever extends between the support hinge and the rear hinge. A distance between the support hinge and the rear hinge, i.e. a length of the flexible portion, may be selected to provide for a sufficiently low bending stiffness in the width direction and rotational stiffness in the rear main direction.

In a particular embodiment, the second lever extends from the support hinge to the rear hinge and further to the guide rail. A rear slide shoe is hingedly arranged on the second lever and guideably supported in a guide channel of the guide rail. The rear hinge is directly connected to the second lever at a position between the support hinge and the rear slide shoe, wherein the second lever comprises the rear flexible portion and the rear coupling portion. The rear flexible portion extends from the support hinge to the rear hinge and the rear coupling portion extends from the rear hinge to the rear slide shoe.

In an embodiment of the support mechanism, the guide comprises two substantially parallel walls extending substantially perpendicular to the roof plane and wherein the rear mechanism is coupled to only a single one of said parallel walls. Thus, space may be spared at the rear mechanism, allowing to provide space for the front mechanism such that the front mechanism may slide further rearwards providing a larger opening in the open state.

In an embodiment, the front flexible portion is formed in an elongated element and the front flexible portion comprises a thinned part of the elongated element. In another embodiment, the front flexible portion is formed in an elongated element and the front flexible portion comprises a through hole through the elongated element. So, the reduced stiffness may be provided by omission of strengthening elements but may as well be provided by thinning, or providing a recess or a through hole in an element.

In an embodiment of the present invention, the front mechanism comprises a parallel construction part. The parallel construction part extends between the front hinge and the guide rail and comprises at least two mechanical couplings between the front hinge and the guide rail. Further, the front flexible portion comprises a single mechanical coupling portion, which provides a single mechanical coupling between the panel mounting portion and said front hinge.

In a particular embodiment, a first mechanical coupling comprises a first slide shoe and a second mechanical coupling comprises a second slide shoe and wherein the guide rail comprises a first guide channel and a second guide channel. The first slide shoe is moveably arranged in the first guide channel and the second slide shoe is moveably arranged in the second guide channel. More in particular, the first guide channel may be arranged in a first wall of the guide rail and the second guide channel may be arranged in a second wall of the guide rail, wherein the second wall is opposite the first wall.

In an embodiment, the rear mechanism comprises a parallel construction part, the parallel construction part extending between the rear hinge and the guide rail, wherein the parallel construction part comprises at least two mechanical couplings between the rear hinge and the guide rail. Further, the rear flexible portion comprises a single mechanical coupling portion, which provides a single mechanical coupling between the panel mounting portion and said rear hinge.

In a particular embodiment, the rear mechanism comprises a first rear lever and a second rear lever. The first rear lever is moveably supported in the guide rail and the second rear lever is moveably supported in the guide rail. Further, the first rear lever and second rear lever are coupled by the rear hinge. The first rear lever extends beyond the rear hinge into the rear flexible portion.

Providing a parallel construction in the respective mechanisms increases an overall stiffness of the mechanism construction between the guide rail and the respective hinge. On the other hand, in a single mechanical coupling portion of the flexible portion, a single coupling element may easily be designed to have a desired stiffness in different degrees of freedom. So, in light of the present invention, at least the stiffness in width direction and the rotational stiffness around the length direction of the single coupling element, forming the flexible portion, may be easily adapted to be relatively low compared to a (rotational) stiffness of the corresponding mechanism.

As above mentioned, a parallel construction may increase a stiffness beyond an element stiffness. It is however virtually impossible to calculate a kind of a system stiffness and compare such a system stiffness to a single element stiffness. Therefore, as used herein, the stiffness of the flexible portion is difficult to be parametrically defined in comparison to the stiffness of a corresponding mechanism. In order to identify the relative stiffness of the different parts and mechanisms, an effective deformation of the different parts and mechanisms may be considered relative to each other. For example, a computer simulation of deformations and rotations as a result of a rotated guide rail may be used to identify deformations in and rotational state of separate elements.

Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art

DETAILED DESCRIPTION OF THE ILLUSTRATIVE EMBODIMENTS

Figure 1A:
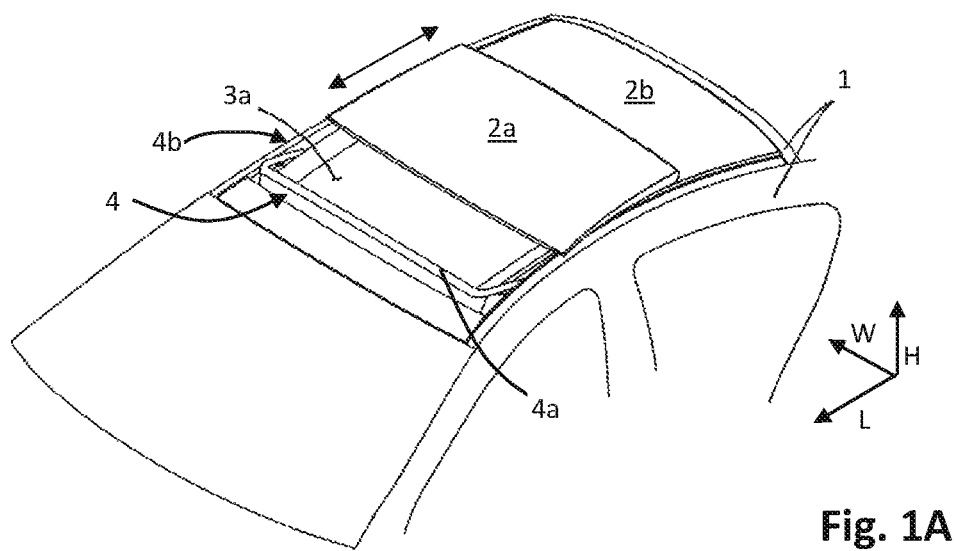
FIG. 1A shows a perspective view of a vehicle roof with an open roof assembly.

The present invention will now be described with reference to the accompanying drawings, wherein the same reference numerals have been used to identify the same or similar elements throughout the several views.

FIG. 1 illustrates a vehicle roof 1 having an open roof assembly arranged therein. The open roof assembly comprises a moveable panel 2a and a fixed panel 2b. The moveable panel 2a is also referred to as a closure member, since the moveable panel 2a is moveable over a first roof opening 3a such to enable to open and to close the first roof opening 3a. A wind deflector 4 is arranged at a front side of the first roof opening 3a.

In the illustrated embodiment, the moveable panel 2a may be in a closed position, which is a position wherein the moveable panel 2a is arranged over and closes the first roof opening 3a and thus usually is arranged in a plane of the vehicle roof 1. Further, the moveable panel 2a may be in a tilted position, which is a position wherein a rear end RE of the moveable panel 2a is raised as compared to the closed position, while a front end FE of the moveable panel 2a is still in the closed position. Further, the moveable panel 2a may be in an open position, which is a position wherein the moveable panel 2a is slid open and the first roof opening 3a is partly or completely exposed.

It is noted that the illustrated vehicle roof 1 corresponds to a passenger car. The present invention is however not limited to passenger cars. Any other kind of vehicles that may be provided with a moveable panel are contemplated as well.

Figure 1B:
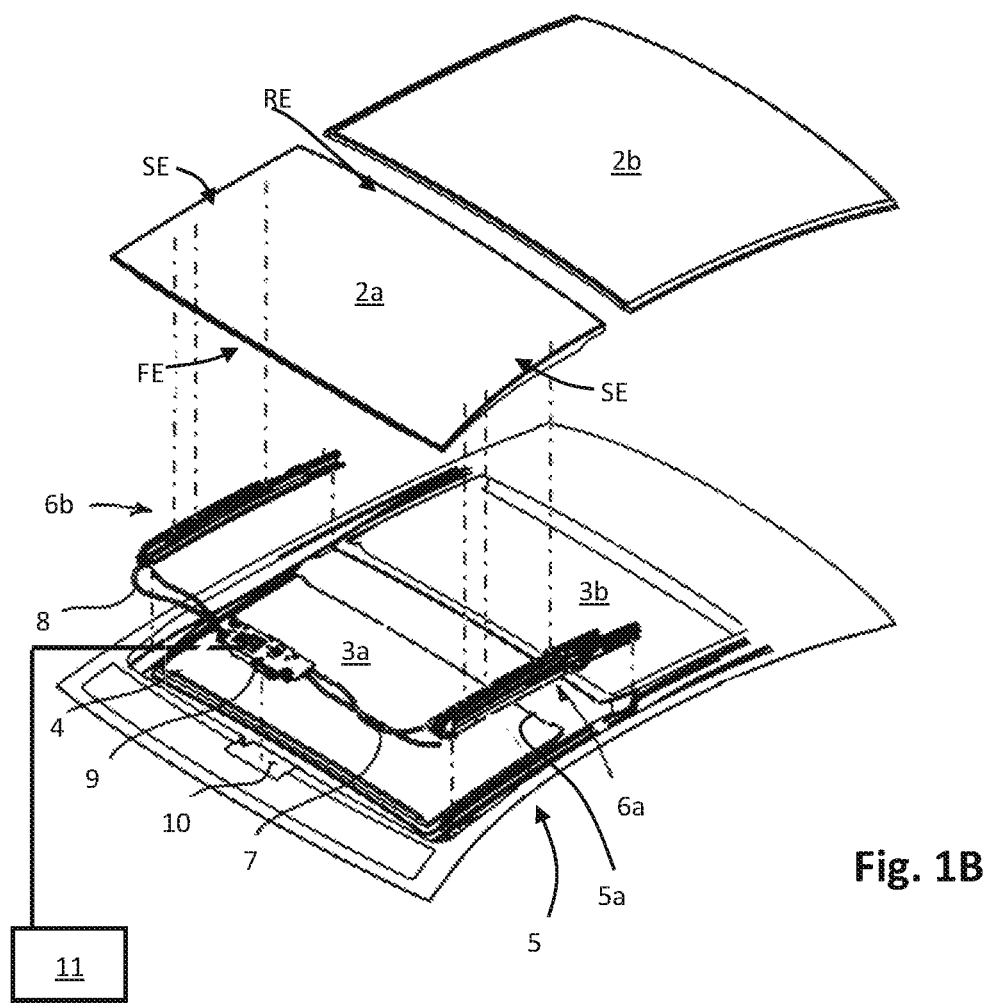
FIG. 1B shows an exploded view of the open roof assembly of FIG. 1A.

FIG. 1B illustrates the same vehicle roof as shown in FIG. 1A having panels 2a and 2b. In particular, while FIG. 1A shows the open roof assembly in the open position, FIG. 1B is an exploded view of the open roof assembly in a closed position. Further, in this exploded view of FIG. 1B, it is shown that there is a second roof opening 3b. The first and second roof openings 3a, 3b are provided in a frame 5 of the open roof assembly. An edge 5a of the frame 5 defines the first roof opening 3a.

The second roof opening 3b is arranged under the fixed panel 2b such that light may enter a vehicle interior space through the fixed panel 2b, presuming that the fixed panel 2b is a glass panel or a similarly transparent panel, for example made of a plastic material or any other suitable material. The second roof opening 3b with a transparent or translucent fixed panel 2b is optional and may be omitted in another embodiment of the open roof assembly.

The wind deflector 4 is commonly a flexible material, e.g. a woven or non-woven cloth having through holes arranged therein or a web or net. The flexible material is supported by a support structure 4a, e.g. a bar-like or tube-like structure, which structure is hingedly coupled, directly or indirectly, to the frame 5 at a hinge 4b.

The wind deflector 4 is arranged in front of the first roof opening 3a and adapts air flow when the moveable panel 2a is in the open position. In its raised position, the wind deflector 4 reduces inconvenient noise due to air flow during driving. When the moveable panel 2a is in the closed position or in the tilted position, the wind deflector 4 is held down below the front end FE of the moveable panel 2a.

Usually, the wind deflector 4 is raised by a spring force when the moveable panel 2a slides to an open position and the wind deflector 4 is pushed down by the moveable panel 2a when the moveable panel 2a slides back into its closed position. In FIG. 1A, the moveable panel 2a is shown in an open position and the wind deflector 4 is shown in a raised position. In FIG. 1B, the moveable panel 2a is shown in a closed position and the wind deflector 4 is correspondingly shown in a position in which it is held down.

FIG. 1B further illustrates a drive assembly having a first guide assembly 6a, a second guide assembly 6b, a first drive cable 7 and a second drive cable 8. The first and second guide assemblies 6a, 6b are arranged on respective side ends SE of the moveable panel 2a and may each comprise a guide and a mechanism. The guide is coupled to the frame 5, while the mechanism comprises moveable parts and is slideably moveable in the guide. The first and the second drive cables 7, 8 are provided between the mechanisms of the respective guide assemblies 6a, 6b and a drive motor 9.

The drive cables 7, 8 couple the drive motor 9 to the mechanisms of the respective guide assemblies 6a, 6b such that upon operating the drive motor 9, the mechanisms start to move. In particular, a core of the drive cable 7, 8 is moved by the drive motor 9 such to push or pull on the mechanisms of the respective guides 6a, 6b. Such a drive assembly is well known in the art and is therefore not further elucidated herein. Still, any other suitable drive assembly may be employed as well without departing from the scope of the present invention. Moreover, in a particular embodiment, a drive motor may be operatively arranged between the respective guides and the respective mechanisms of the guide assemblies 6a, 6b and, in such embodiment, a drive assembly may be omitted completely.

In the illustrated embodiment, the guide assemblies 6a, 6b may start movement with raising the rear end RE of the moveable panel 2a, thereby bringing the moveable panel 2a in the tilted position. Then, from the tilted position, the guide assemblies 6a, 6b may start to slide to bring the moveable panel 2a in the open position. The present invention is however not limited to such embodiment. For example, in another embodiment, the moveable panel 2a may be moveable to a tilted position by raising the rear end RE, while an open position is reached by first lowering the rear end RE and then sliding the moveable panel 2a under the fixed panel 2b or any other structure or element provided behind the rear end RE of the moveable panel 2a. In further exemplary embodiments, the moveable panel 2a may be merely moveable between a closed position and a tilted position or between a closed position and an open position.

In the illustrated embodiment, the drive motor 9 is mounted near or below the front end FE of the moveable panel 2a at a recess 10. In another embodiment, the drive motor 9 may be positioned at any other suitable position or location. For example, the drive motor 9 may be arranged near or below the rear end RE of the moveable panel 2a or below the fixed panel 2b.

A control unit 11 is schematically illustrated and is operatively coupled to the drive motor 9. The control unit 11 may be any kind of processing unit, either a software controlled processing unit or a dedicated processing unit, like an ASIC, as well known to those skilled in the art. The control unit 11 may be a stand-alone control unit or it may be operatively connected to another control unit, like a multipurpose, generic vehicle control unit. In yet another embodiment, the control unit 11 may be embedded in or be part of such a generic vehicle control unit. Essentially, the control unit 11 may be embodied by any control unit suitable for, capable of and configured for performing operation of the drive motor 9 and thus the moveable roof assembly.

Figure 2A:
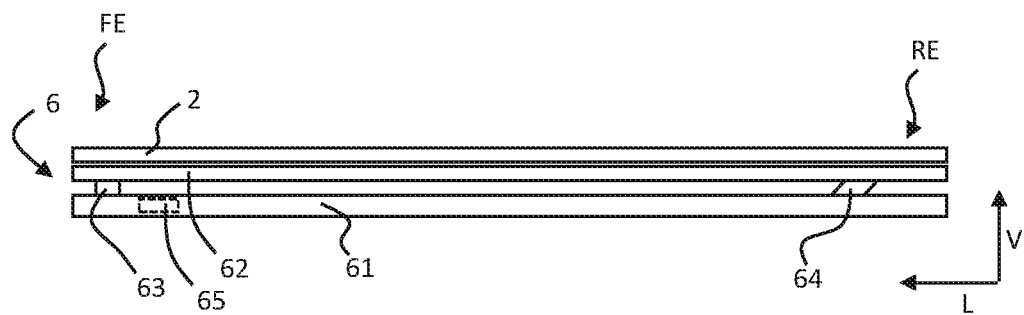
FIGS. 2A-2D illustrate an opening operation of a prior art open-roof assembly.

FIG. 2A schematically illustrates a guide assembly 6 for use in an open-roof system as shown in FIGS. 1A an 1B. On the guide assembly 6, a closure member 2 is provided. The closure member 2 may be a glass panel or any other suitable panel as above described. The guide assembly 6 comprises a guide rail 61, which provides at least one guide channel for guiding one or more elements of a mechanism of the guide assembly 6. In the illustrated embodiment, the guide assembly 6 comprises a front mechanism 63 and a rear mechanism 64. Both mechanisms 63, 64 are coupled to and support a mounting element 62. The guide assembly 6 further comprises a locking mechanism 65. The locking mechanism 65 is coupled to the rear mechanism 64 by an elongated coupling element (not shown), as known from the prior art. Upon moving the coupling element towards the rear mechanism 64, the rear mechanism 64 is operated, as illustrated in and described hereinbelow in relation to FIGS. 2B-2D.

The closure member 2 is attached to the mounting element 62. Upon operating the front mechanism 63 and/or the rear mechanism 64, the mounting element 62 is moved along a predetermined trajectory. In the illustrated embodiment, the front mechanism 63 and the rear mechanism 64 are each mechanically designed to provide for such predetermined trajectory. In another suitable embodiment, the trajectory may be provided in any other suitable manner. For example, using multiple motors, a control unit may be configured to control the multiple motors such that a predetermined trajectory is achieved.

In order to operate the front mechanism 63 and the rear mechanism 64, in the illustrated embodiment, a drive cable may be connected between a motor and a sliding element, wherein the sliding element is arranged in the guide rail 61 and is arranged to slide through the guide rail 61 when the motor pulls or pushes the drive cable. Such a drive assembly is well known from the art and therefore not shown in detail herein. Moreover, the present invention is not limited in any way to such drive assembly. Any other drive assembly suitably achieving the operation of the front mechanism 63 and the rear mechanism 64 may be employed as well within the scope of the present invention.

Figure 2B:
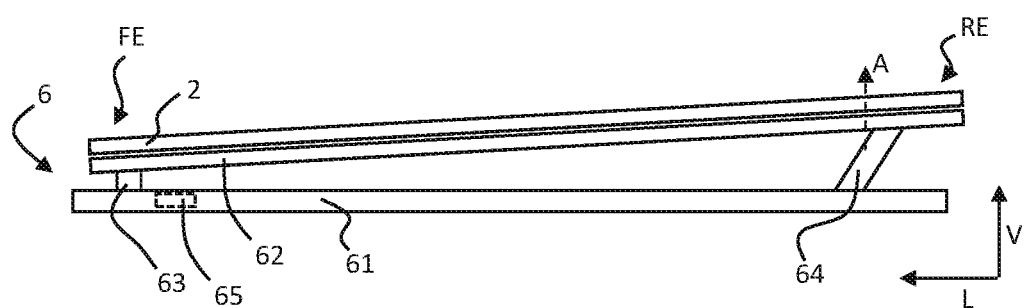

As may be apparent, in FIG. 2A, the closure member 2 is in the closed position. FIG. 2B illustrates a first stage of an opening process. In FIG. 2B, the locking mechanism 65 has moved towards the rear mechanism 64, thereby operating the rear mechanism 64. In this stage of the operation, the rear mechanism 64 has moved the mounting element 62 in direction A substantially parallel to the substantially vertical direction V, which is substantially perpendicular to the longitudinal direction L. In order to enable the movement of the rear end RE, the front end FE may be moved by the front mechanism 63, but this is not required.

It is noted that the use of the term 'vertical direction' should not be construed as limiting, but merely an indication of a direction perpendicular to the plane of the roof, which commonly has an orientation in a substantially horizontal plane. 'Vertical direction' is thus intended to refer to a direction substantially perpendicular to a plane in which the open-roof assembly is oriented, when in a closed position.

Figure 2C:
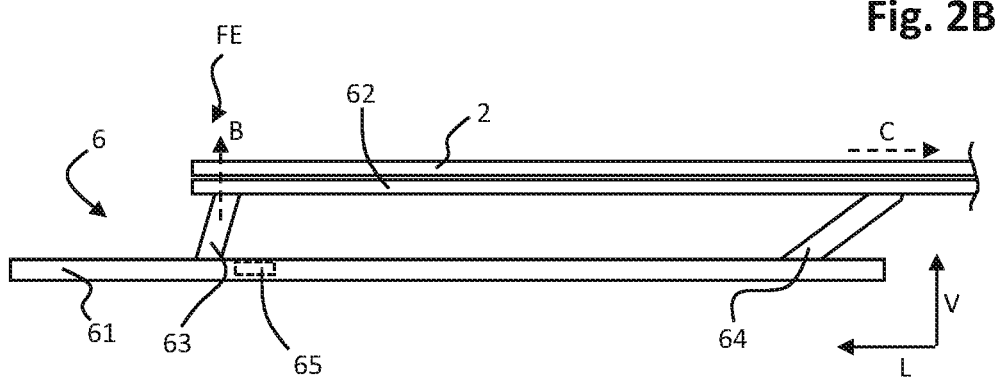

FIG. 2C shows a further stage of the opening process, wherein the locking mechanism 65 has moved further rearwards and has arrived at its end position, where it is locked in its position, as known in the art. With the locking mechanism 65 locked in its position, the rear mechanism 64 is locked in its position and orientation. Meanwhile, the front mechanism 63 has lifted in direction B substantially parallel to the substantially vertical direction V and has moved rearwards in direction C which is substantially parallel to the longitudinal direction L. The mounting element 62 has moved with the front mechanism 63 rearwards. The mounting element 62 is slidably supported by the rear mechanism 64 such that upon moving rearwards with the front mechanism 63, the mounting element 62 slides along the rear mechanism 64.

Figure 2D:
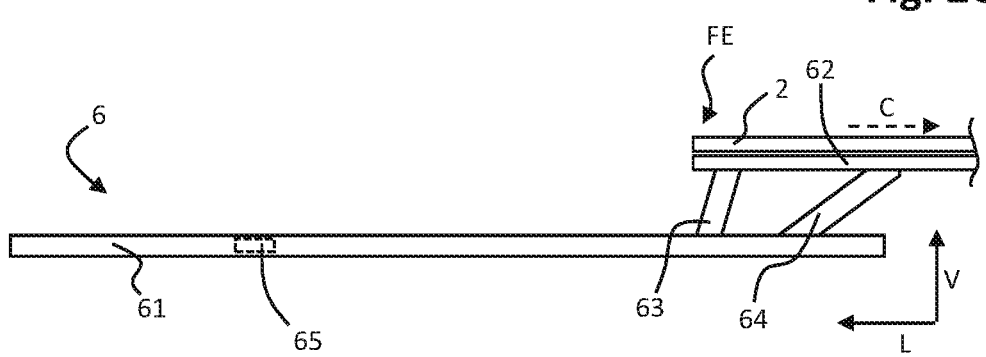

A fully open position of the closure member is shown in FIG. 2D. The front mechanism 63 has moved further rearwards, thereby sliding the closure member 2 rearwards. The locking mechanism 65 has however remained in its locked position.

As apparent to those skilled in the art, a closing process follows the same stages as illustrated and described, but in the reverse order.

Figure 3A:
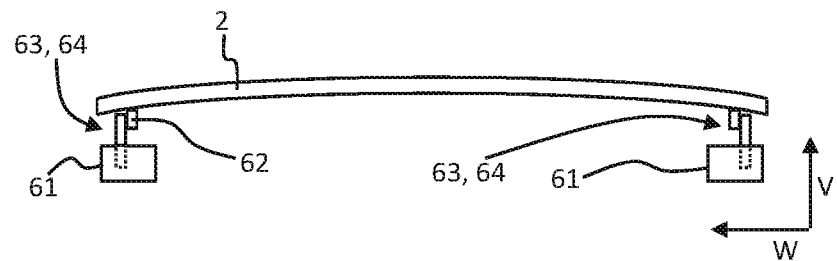
FIGS. 3A-3C schematically illustrate an inventive concept of the present invention.
Figure 3B:
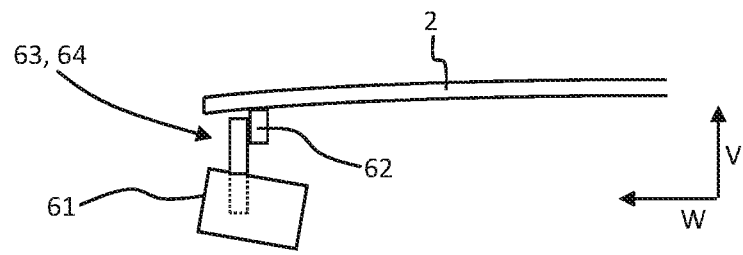
Figure 3C:
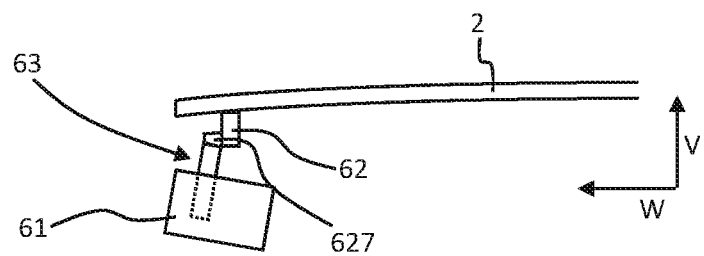

FIGS. 3A-3C show a cross-section in a width direction W, which is perpendicular to the longitudinal direction L and to the vertical direction V. The closure member 2 is mounted to the mounting element 62. The mounting element 62 is coupled to the front or rear mechanism 63, 64, which are supported by the guide rail 61. FIG. 3A illustrates the intended configuration and orientation, wherein a vertical wall of the guide rail 61 extends in the vertical direction V. It is noted that, without departing from the scope of the present invention, the intended orientation of the guide rail 61 may be any other orientation and the present invention does not require that any wall of the guide rail 61 extends in the vertical direction.

FIG. 3B shows one of the guide rails 61, wherein the guide rail 61 is rotated around the longitudinal direction L such that the vertical wall is in a slanted orientation. Such rotation of the guide rail 61 frequently occurs and may be up to about three degrees e.g. due to manufacturing tolerances, although it may be even more depending on the circumstances.

The closure member 2 and the mounting element 62 remain in their intended orientations, since the closure member 2 is prevented from rotating due to its coupling to the other one of the guide rails 61 (FIG. 3A). The front or rear mechanism 63, 64 is coupled between the mounting element 62 and the guide rail 61 and, in the prior art, needs to deform to be able to absorb the orientation difference between the guide rail 61 and the mounting element 62. Any such deformation in a mechanism results in heavy running and potentially even blockage of movement of any part of the mechanism. Further, noise will be generated due to e.g. friction between mechanism parts, potentially further leading to excessive wear of such parts.

The present invention proposes to provide a flexible portion in the mechanical coupling between the guide rail 61 and the closure member 2 such that the mechanism does not need to absorb the whole orientation difference, although deformation cannot be prevented completely as is explained below.

In the present invention, as shown in FIG. 3C, a predetermined front flexible portion 627 is provided between the front mechanism 63 and the mounting element 62 such that the mounting element 62 follows the orientation of the closure member 2, while the mechanism 63 can follow the orientation of the guide rail 61. The front mechanism 63 cooperates with the guide rail 61; usually the front mechanism 63 has a part that slides through a guide channel in the guide rail 61. It may therefore be preferred to have the mechanism follow the orientation of the guide rail 61. Still, it is contemplated that a coupling between the guide rail 61 and the front mechanism 63 may as well be provided with a flexible portion to reduce deformation of the mechanism 63. Further, a predetermined flexible portion is preferably provided at the rear mechanism 64 to decouple an orientation difference between the guide rail 61 and the closure member 2 from the rear mechanism 64. In practice, a front flexible portion 627, a rear flexible portion or both may be provided to reduce stress and deformation in the respective mechanisms.

Figure 4A:
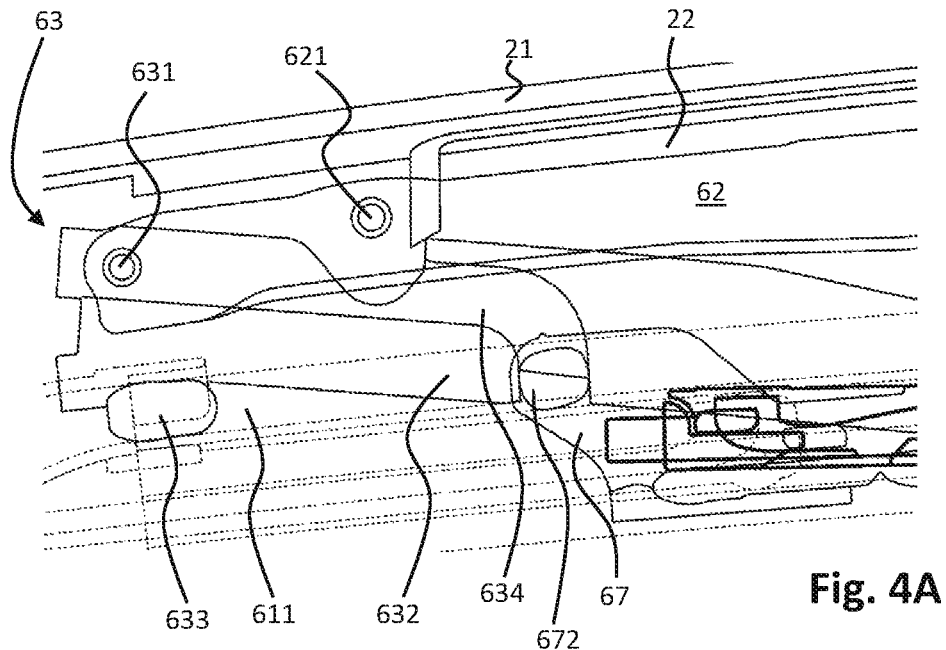
FIG. 4A shows a side view of an embodiment of a front mechanism.

FIG. 4A shows a particular embodiment of a front mechanism 63. The front mechanism 63 comprises a front hinge 631, a front lever 632, a slide shoe 633 and a guide curve 634. The slide shoe 633 is moveable in a first guide channel 611 provided in the guide rail 61, which is shown in dotted lines. The mounting element 62 is coupled to the front lever 632 at the front hinge 631. The mounting element 62 further comprises a mounting hole 621. At the mounting hole 621, a bracket 22 is coupled. The bracket 22 is attached to a closure member panel 21. The closure member panel 21 and the bracket 22 together form the closure member 2.

The guide rail 61 further slideably supports a sliding element 67, which is provided with an operating pin 672. The operating pin 672 is configured and arranged to cooperate with the guide curve 634 for moving the front lever 632, thereby moving the slide shoe 633 through the first guide channel 611.

Figure 4B:
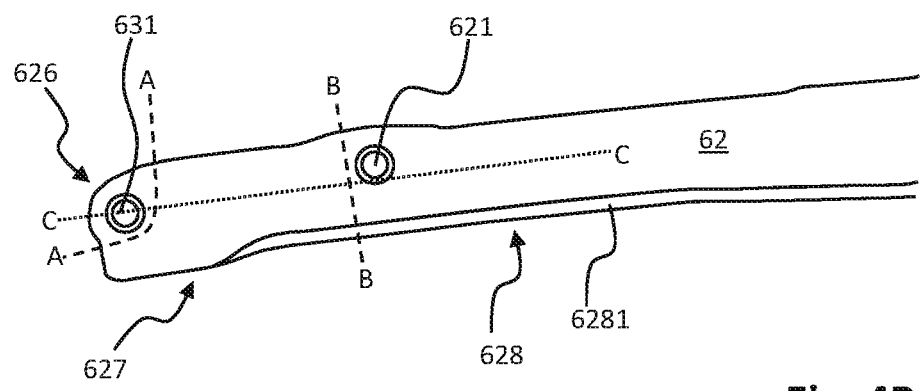
FIG. 4B shows a side view of a part of the embodiment of the front mechanism according to FIG. 4A.

FIG. 4B shows the mounting element 62 in isolation. The mounting element 62 comprises a through hole for the front hinge 631, which is shown in and described in relation to FIG. 6A in more detail. The through hole for the front hinge 631 is provided in a coupling portion 626. A front flexible portion 627 is provided between the dashed lines A-A and B-B. Beyond the dashed line B-B, a panel mounting portion 628 is provided. The mounting hole 621 is provided in the panel mounting portion 628.

The panel mounting portion 628 is provided with a flange 6281 for increasing a stiffness of the panel mounting portion 628 in the width direction W, in particular as compared to the front flexible portion 627. Apart from the flange 6281, the mounting element 62 is a plate-like element and extending in a front main direction along line C-C, which extends from the coupling portion 626 through the front flexible portion 627 to the panel mounting portion 628. The front flexible portion 627 is designed such that the rotational stiffness of the mounting element 62 is reduced compared to the rotational stiffness of the panel mounting portion 628 in a mounted state and the rotational stiffness of the coupling portion 626 as held by the front hinge 631 of the front mechanism 63. Further, the stiffness in the width direction is designed to be reduced as compared to the stiffness of the coupling portion 626 and the panel mounting portion 628, both in the mounted state. The stiffness may be designed by either increasing a stiffness of the coupling portion 626, the panel mounting portion 628 or both, or by decreasing the stiffness of the flexible portion 627. In the illustrated embodiment, the flange 6281 is provided as above mentioned. Alternatively or additionally, at the flexible portion 627, a thinned part, a recess or a through hole may be provided to reduce the stiffness. Moreover, if the stiffness of the panel mounting portion 628 or the coupling portion 626 is preferred to be increased, a thickness of the elongated mounting element 62 may be increased and the stiffness of the flexible portion 627 may be maintained by providing additional stiffness-reducing features like a thinned part, a recess or a through-hole, for example.

Due to the difference in stiffness, a force generated by a rotation of the front mechanism 63 due to a rotation of the guide rail 61 will mainly deform the front flexible portion 627, thereby reducing deformation of the front mechanism 63. As the stiffness of the front mechanism 63 cannot become infinite and the stiffness of the front flexible portion 627 cannot become zero, there will still occur some deformation in the front mechanism 63 albeit significantly less than in the prior art, wherein no flexible portion is provided.

It is noted that the stiffness of the panel mounting portion 628 may be relatively low when not mounted. The stiffness of the panel mounting portion 628 may be significantly increased as soon as it is coupled to the bracket 22. Therefore, it is not possible to define any specific stiffness ratio between the front flexible portion 627 and the panel mounting portion 628. The same applies mutatis mutandis with respect to the coupling portion 626, which in a mounted state is held by the front hinge 631. Moreover, the stiffness of the coupling portion 626 will be mainly defined by the stiffness of the front hinge 631 than by the stiffness of the material of the coupling portion 626 itself.

Figure 5A:
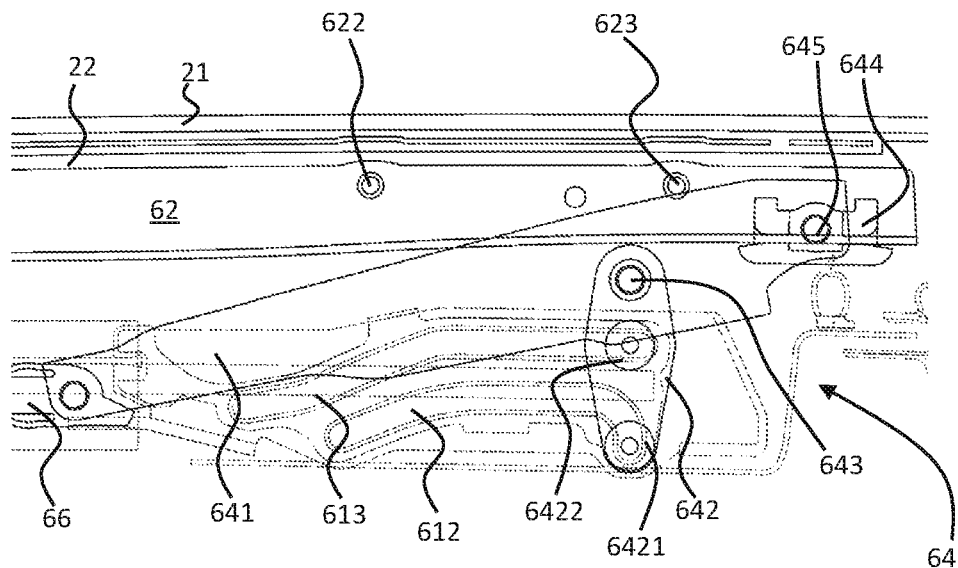
FIG. 5A shows a side view of an embodiment of a rear mechanism.

FIG. 5A shows a particular embodiment of a rear mechanism 64. The rear mechanism 64 comprises a first rear lever 641 and a second rear lever 642. The first and second rear levers 641, 642 are coupled at a rear hinge 643. The first rear lever 641 is at a first end coupled to an elongated coupling element 66, which is coupleable to the sliding element 67 (FIG. 4A) for operating the rear mechanism 64. At a second end, the first rear lever 641 is coupled to a slide pad 644 through a support hinge 645. The second rear lever 642 comprises a first protruding pin 6421 and a second protruding pin 6422, which are movable through respective first and second curves 612, 613.

The mounting element 62 is slideably supported by the slide pad 644. The mounting element 62 comprises a second and third mounting hole 622, 623, respectively, for coupling to the bracket 22 and the closure member panel 21.

Figure 5B:
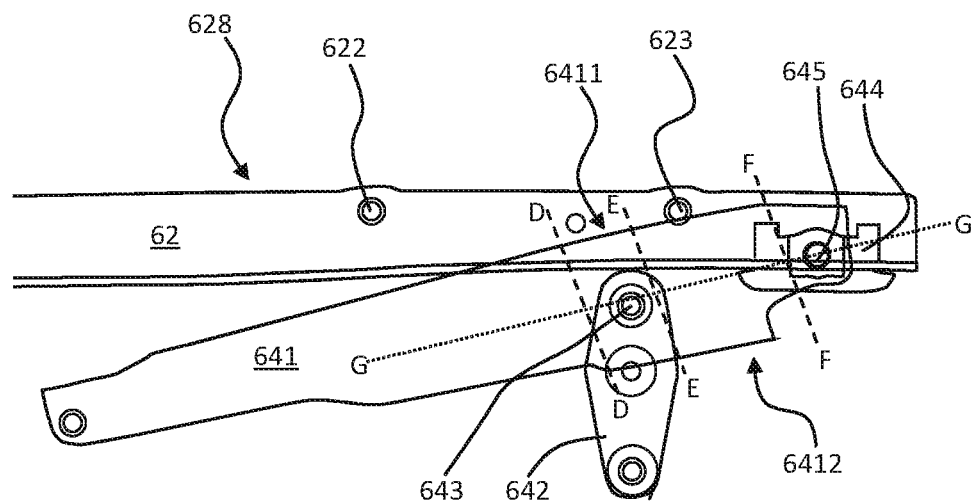
FIG. 5B shows a side view of a part of the embodiment of the rear mechanism according to FIG. 5A.

FIG. 5B shows the mounting element 62, the first rear lever 641 and the second rear lever 642 in isolation. The rear mechanism 64 is shown in the tilted position, wherein the closure member 2 is lifted at its rear end RE. In the tilted position of the open roof assembly, the second rear lever 642 is arranged in a vertical orientation, i.e. a virtual line through the rear hinge 643 and the first and second pins 6421, 6422 is substantially parallel to the vertical direction. The first rear lever 641 is hingedly coupled to the second rear lever 642 at the rear hinge 643. Thus, a part of the first rear lever 641 between dashed line D-D and dashed line E-E forms a rear coupling portion 6411. A part of the first rear lever 641 between the dashed line E-E and dashed line F-F forms a rear flexible portion 6412 such that the support hinge 645 and the slide pad 644 are enabled to rotate and shift with the panel mounting portion 628 of the mounting element 62.

It is noted that the panel mounting portion 628 slides through the slide pad 644, when the closure member 2 slides from the tilted position to the open position. Therefore, the rear flexible portion 6412 is provided between the slide pad 644 and the rear hinge 643 and not in the mounting element 62 (cf. the front flexible portion 627).

The rear flexible portion 6412 extends along a rear main direction along line G-G extending from the rear coupling portion 6411 to the panel mounting portion 628 at the slide pad 644. The rear flexible portion 6412 is designed to provide sufficient support for the closure member 2 in the vertical direction, while providing sufficient flexibility in the width direction and having a relatively low rotational stiffness around the rear main direction G-G. In the illustrated embodiment, this is achieved by selecting a plate-like element having a relatively large vertical dimension, i.e. in the vertical direction, which is about perpendicular to the rear main direction G-G. In the width direction, the first rear lever 641 may be designed with a predetermined thickness and selection of material at the rear flexible portion 6412 to at least locally provide the desired stiffness. Other portions of the first rear lever 641 may be provided with additional stiffening features, like a flange, thickness, and the like, to provide for a higher stiffness, if so desired.

As above mentioned, the present invention is based on the concept of designing a suitable ratio of stiffness between one or both of the respective mechanisms and corresponding one or two flexible portions. The ratio of stiffness essentially determines a ratio of deformation in the respective parts. Hence, the present invention is not only concerned with defining a suitable stiffness in the flexible portion, but as well with defining a suitable stiffness of the mechanisms. In the embodiment of the rear mechanism 64 as illustrated in FIGS. 5A and 5B, stiffness of the rear mechanism 64 is inter alia determined by the parallel construction between the guide rail and the rear hinge 643 by the first rear lever 641 as a first mechanical coupling and the second rear lever 642 as a second mechanical coupling. The triangular construction increases the overall stiffness of the rear mechanism 64.

Figure 6A:
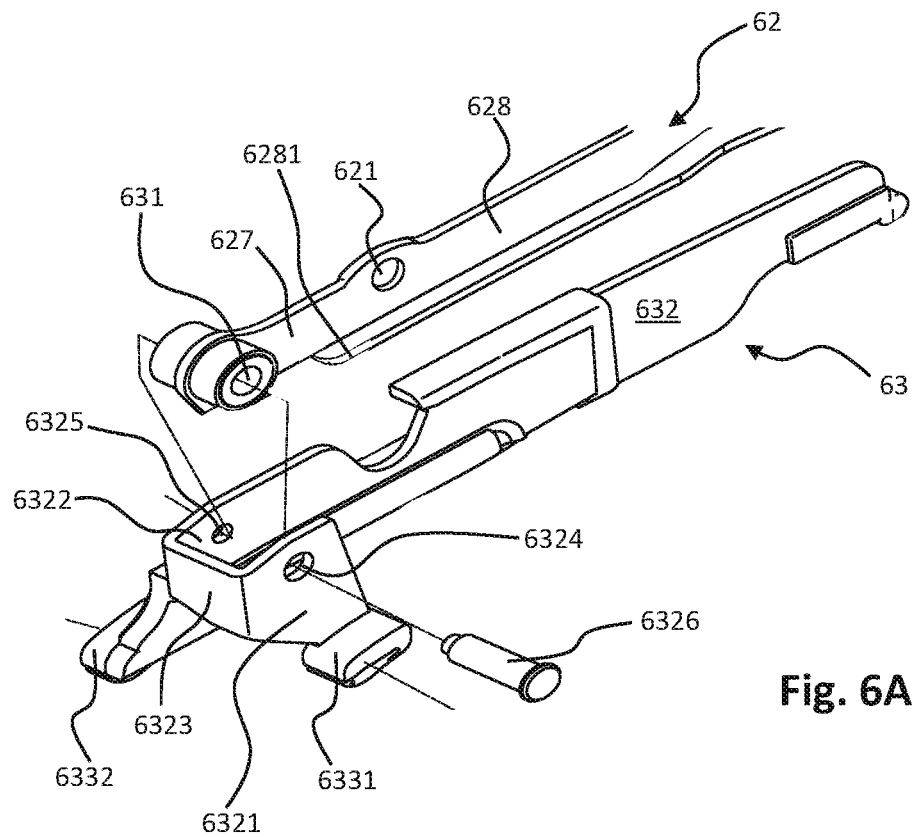
FIG. 6A shows a perspective view of a part of the embodiment of the front mechanism according to FIG. 4A.

FIG. 6A shows the front mechanism 63 of FIGS. 4A and 4B in a perspective view, wherein it is shown that an end portion of the front lever 632 may comprise a first slide shoe 6331 and a second slide shoe 6332. Both slide shoes are attached to a U-shaped portion. The U-shaped portion comprises a first leg 6321, a second leg 6322 and a base 6323 therebetween. The first slide shoe 6331 is coupled to the first leg 6321 and the second slide shoe is coupled to the second leg 6322. In the first leg 6321, a first hinge hole 6324 is provided and in the second leg 6322 a second hinge hole 6325 is provided. A hinge axle 6326 is arranged through the first hinge hole 6324, the front coupling portion 626 and the second hinge hole 6325 to form the front hinge 631. Thus, the front hinge 631 is coupled to the guide rail 61 through the first leg 6321 and the first slide shoe 6331 and through the second leg 6322 and the second slide shoe 6332, forming a parallel construction part. It is noted that the first slide shoe 6331 may be arranged in a first guide channel of the guide rail, e.g. guide channel 611 (FIG. 4A), while the second slide shoe 6332 may be arranged in a second guide channel. Moreover, the first guide channel may be arranged in a first wall of the guide rail, while the second guide channel may be arranged in a second wall of the guide rail, wherein the first wall and the second wall are arranged opposite to each other.

Figure 6B:
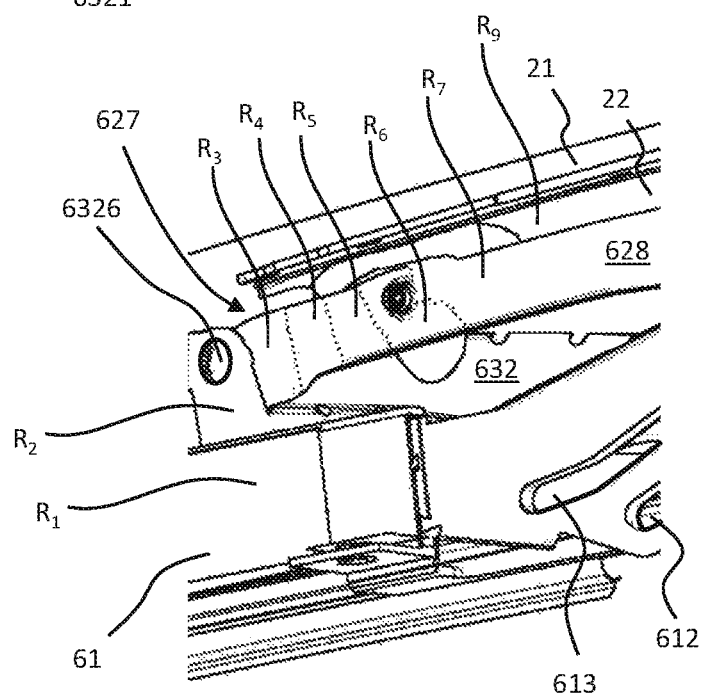
FIG. 6B shows a perspective view of the part of FIG. 6A, indicating local rotational deformation in the front mechanism.

FIG. 6B illustrates an effect of the present invention. FIG. 6B is a result of a computer aided engineering process, wherein a computer model of the support assembly is provided and the guide rail 61 has been rotated around the longitudinal direction over three degrees. A rotational orientation is determined for each part of the shown assembly. References $R_1$-$R_9$ have been provided to indicate a rotation of the indicated part. Each reference $R_1$-$R_9$ represents a range. The rotation of the referenced parts lies within such range:

|       | Minimum rotation | Maximum rotation |
|-------|------------------|------------------|
| $R_9$ | 0.00°            | −0.35°           |
| $R_8$ | −0.35°           | −0.71°           |
| $R_7$ | −0.71°           | −1.07°           |
| $R_6$ | −1.07°           | −1.42°           |
| $R_5$ | −1.42°           | −1.78°           |
| $R_4$ | −1.78°           | −2.14°           |
| $R_3$ | −2.14°           | −2.50°           |
| $R_2$ | −2.50°           | −2.85°           |
| $R_1$ | −2.85°           | −3.21°           |

So, the guide rail 61 is indicated by reference $R_1$, indicating that the rotation of the guide rail lies in the range of about −2.85°-about −3.21° around the longitudinal direction. The front lever, near the front hinge 6326, is rotated over an angle in the range of about −2.50°-about −2.85° ($R_2$). On the other hand, the bracket 22 is rotated less than about 0.35° ($R_9$), while the panel mounting portion 628 is indicated by $R_7$, which corresponds to a rotation in the range of about −0.71°-about 1.07°.

In the flexible portion 627, a rotation is indicated to change from $R_3$ to $R_6$. Hence, the front flexible portion 627 is deformed to couple the hinge axle 6326 at a rotation of at least −2.50° to the panel mounting portion 628 at a rotation of at most 1.07°, bridging a rotation of at least 1.43° and up to 2.14°, i.e. about 50% of the total rotational difference between the guide rail 61 and the closure member 2. More importantly, the rotation in the front mechanism 63 is limited to about 0.35° (with a maximum of about 0.71°), thereby preventing excessive deformation of the front mechanism and the corresponding heavy running and noise. For the rear mechanism, the same applies, taking into account that the slideable coupling at the slide pad 644 may absorb a relatively large part of the rotational difference, but still deformation in the rear mechanism is alleviated.

Figure 7:
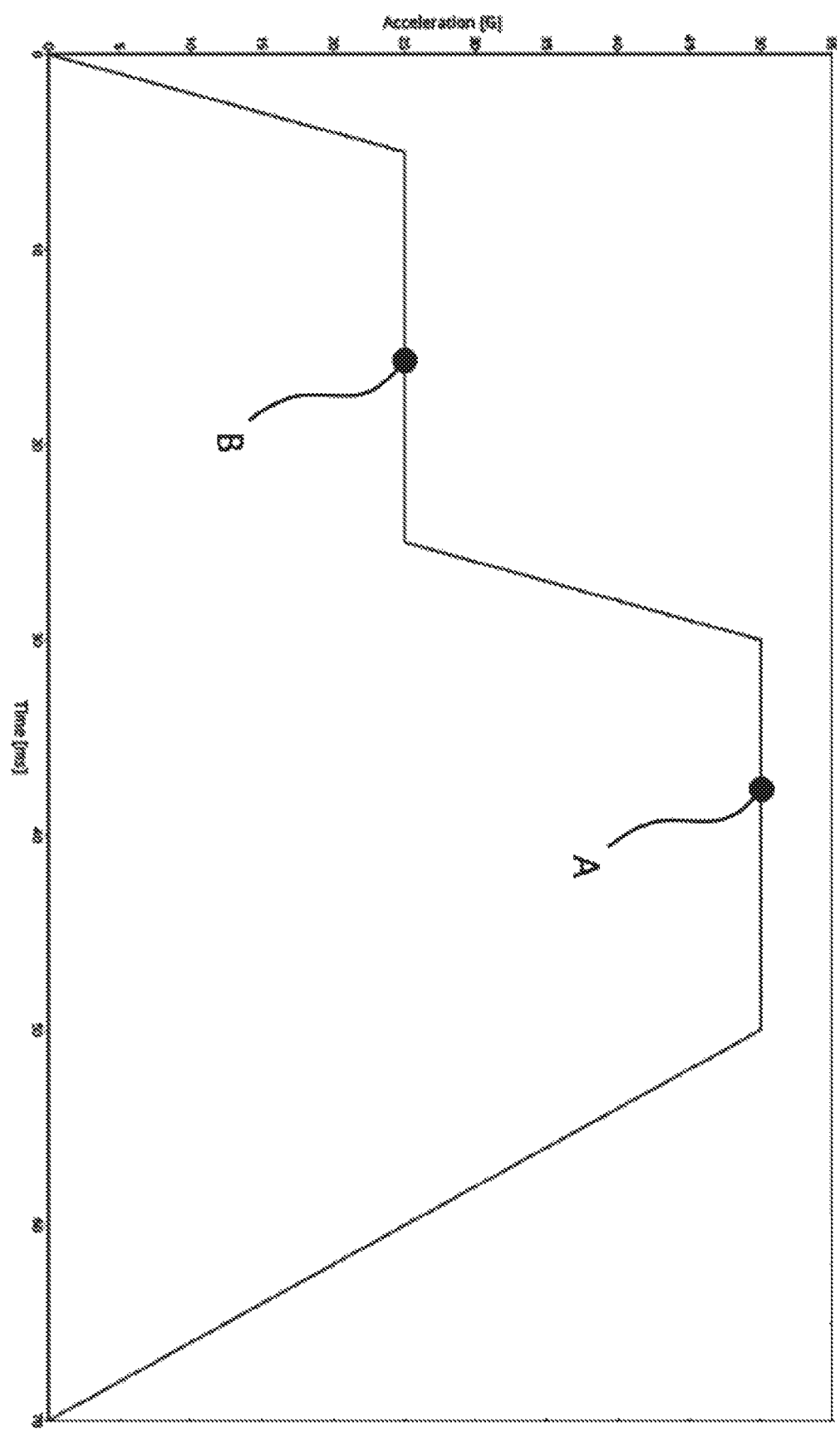
FIG. 7 shows a graph representing a simulation result of a vehicle crash.

FIG. 7 illustrates a graph of a simulation of a crash. The graph shows on the horizontal axis time in milliseconds and the vertical axis represents an acceleration in gravitational units G (1 G corresponding to the earth gravitational acceleration of about 9.81 m/s$^2$). As apparent to those skilled in the art, the acceleration results in an inertia force. The simulation is performed on a computer model of the support mechanism: a first time A on a support mechanism without a flexible portion and a second time B on the support mechanism of the present invention having a front flexible portion.

At time 0 ms, it is simulated that a vehicle crash starts and an acceleration (deceleration) starts to increase and at about 5 ms the acceleration reaches a value of 25 G. At this point, a crumple zone of the vehicle keeps the acceleration constant. After about 25 ms, the crumple zone is completely used and the acceleration increase again and increases to a value of about 50 G after about 30 ms. After about 50 ms, the acceleration of the vehicle starts to reduce and becomes 0 after about 70 ms. It is noted that this simulation represents an actual crash, but in practice different vehicles will behave differently depending on the circumstances. For example, speed, direction, object against which the vehicle crashes and other aspects will affect the actual crash profile of the acceleration.

In the first simulation A, due to the absence of the flexible portion, after about 38 ms, when the acceleration is 50 G, first cracks in one of the mechanism parts is observed, while after about 40 ms another element actually breaks. In the second simulation B with a suitably designed front flexible portion, after about 14 ms with the acceleration of 25 G in the crumple zone, the front flexible portion starts to plastically deform, thereby absorbing a significant amount of energy, due to which the other mechanism parts do not crack or break, not even during the period of the acceleration of 50 G. So, the flexible portion, in particular the front flexible portion, may be designed to deform at an acceleration corresponding to an acceleration during deformation of the crumple zone in a crash. The actual value of such acceleration may be dependent on the actual vehicle and its properties. A person skilled in the art is considered to be able to determine a suitable stiffness corresponding to the particular vehicle properties.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, it is contemplated that structural elements may be generated by application of three-dimensional (3D) printing techniques. Therefore, any reference to a structural element is intended to encompass any computer executable instructions that instruct a computer to generate such a structural element by three-dimensional printing techniques or similar computer controlled manufacturing techniques. Furthermore, any such reference to a structural element is also intended to encompass a computer readable medium carrying such computer executable instructions.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A support mechanism for an open-roof assembly for use in a vehicle roof, the vehicle roof extending in a roof plane, the roof plane extending in a longitudinal direction and a width direction, the width direction being perpendicular to the longitudinal direction, wherein the open-roof assembly comprises a moveable panel for closing an opening in the vehicle roof, the support mechanism comprising:
    a panel support assembly, comprising:
        a panel mounting portion;
        a front support portion fixedly coupled to the panel mounting portion, comprising a front coupling portion; and
        a rear support portion slideably coupled to the panel mounting portion, comprising a rear coupling portion;
    a guide assembly, comprising:
        an elongated guide rail extending in the longitudinal direction;
        a front mechanism slideably arranged in the guide rail and comprising a front hinge, the front coupling portion being coupled to the front hinge; and
        a rear mechanism arranged in the guide rail and comprising a rear hinge, the rear coupling portion being coupled to the rear hinge;
    wherein the panel support assembly comprises at least one flexible portion selected from a front flexible portion and a rear flexible portion,
    wherein the front flexible portion is comprised in the front support portion and extends in a front main direction, the front main direction extending from the front coupling portion to the panel mounting portion;
    wherein the rear flexible portion is comprised in the rear support portion and extends in a rear main direction, the rear main direction extending from the rear coupling portion to the panel mounting portion; and
    wherein the flexible portion is provided with a low bending stiffness in the width direction and with a low rotational stiffness in the respective main directions such that orientation deviations between the panel support assembly and the guide assembly result in larger rotational deformation in at least one of the respective flexible portions than in the respective mechanisms.

2. The support mechanism according to claim 1, wherein the front mechanism comprises a first and a second slide shoe and the guide rail comprises a first guide channel and a second guide channel, the second guide channel opposing the first guide channel, and
    wherein the first slide shoe is slideably arranged in the first guide channel and the second slide shoe is slideably arranged in the second guide channel.

3. The support mechanism according to claim 1, wherein the front hinge comprises a U-shaped portion comprising a base and two legs extending from the base, wherein an axle is supported by the two legs, and
    wherein the front coupling portion comprises a through hole, the front coupling portion being at least partially arranged between the two legs and the axle is arranged through the through hole for hingedly supporting the panel support assembly.

4. The support mechanism according to claim 1, wherein the panel mounting portion, the front flexible portion and the front coupling portion are formed by a single element, the single element comprising a plate-like base part extending substantially perpendicular to the roof plane, wherein the panel mounting portion comprises means for increasing a bending stiffness in the width direction and wherein the front flexible portion lacks means for increasing a bending stiffness in the width direction.

5. The support mechanism according to claim 1, wherein the rear mechanism comprises a first curve track and a second curve track and a first lever comprising a first pin and a second pin, wherein the first pin is arranged in and guided through the first curve track and the second pin is arranged in and guided through the second curve track, and
    wherein the first curve track and the second curve track are spaced apart in a direction perpendicular to the roof plane.

6. The support mechanism according to claim 1, wherein the guide rail comprises two substantially parallel walls extending substantially perpendicular to the roof plane and wherein the rear mechanism is coupled to only a single one of said parallel walls.

7. The support mechanism according to claim 1, wherein the front flexible portion is formed in an elongated element and wherein the front flexible portion comprises a thinned part of the elongated element.

8. The support mechanism according to claim 1, wherein the front flexible portion is formed in an elongated element and wherein the front flexible portion comprises a through hole through the elongated element.

9. The support mechanism according to claim 1, wherein the front mechanism comprises a parallel construction part, the parallel construction part extending between the front hinge and the guide rail, the parallel construction part comprising at least two mechanical couplings between the front hinge and the guide rail, and wherein the front flexible portion comprises a single mechanical coupling portion, the single mechanical coupling portion providing a single mechanical coupling between the panel mounting portion and said front hinge.

10. The support mechanism according to claim 1, wherein a first mechanical coupling comprises a first slide shoe and a second mechanical coupling comprises a second slide shoe and wherein the guide rail comprises a first guide channel and a second guide channel, the first slide shoe being moveably arranged in the first guide channel and the second slide shoe being arranged in the second guide channel.

11. The support mechanism according to claim 10, wherein the first guide channel is arranged in a first wall of the guide rail and the second guide channel is arranged in a second wall of the guide rail, the second wall being opposite the first wall.

12. A support mechanism for an open-roof assembly for use in a vehicle roof, the vehicle roof extending in a roof plane, the roof plane extending in a longitudinal direction and a width direction, the width direction being perpendicular to the longitudinal direction, wherein the open-roof assembly comprises a moveable panel for closing an opening in the vehicle roof, the support mechanism comprising:
  a panel support assembly, comprising:
    a panel mounting portion;
    a front support portion fixedly coupled to the panel mounting portion, comprising a front coupling portion; and
    a rear support portion slideably coupled to the panel mounting portion, comprising a rear coupling portion;
  a guide assembly, comprising:
    an elongated guide rail extending in the longitudinal direction;
    a front mechanism slideably arranged in the guide rail and comprising a front hinge, the front coupling portion being coupled to the front hinge; and
    a rear mechanism arranged in the guide rail and comprising a rear hinge, the rear coupling portion being coupled to the rear hinge;
  wherein the panel support assembly comprises at least one flexible portion selected from a front flexible portion and a rear flexible portion,
  wherein the front flexible portion is comprised in the front support portion and extends in a front main direction, the front main direction extending from the front coupling portion to the panel mounting portion;
  wherein the rear flexible portion is comprised in the rear support portion and extends in a rear main direction, the rear main direction extending from the rear coupling portion to the panel mounting portion; and
  wherein the flexible portion is provided with a bending stiffness in the width direction and with a rotational stiffness in the respective main directions such that orientation deviations between the panel support assembly and the guide assembly result in larger rotational deformation in at least one of the respective flexible portions than the same rotational deformation in the respective mechanisms.

13. The support mechanism according to claim 12, wherein the front mechanism comprises a first and a second slide shoe and the guide rail comprises a first guide channel and a second guide channel, the second guide channel opposing the first guide channel, and wherein the first slide shoe is slideably arranged in the first guide channel and the second slide shoe is slideably arranged in the second guide channel.

14. The support mechanism according to claim 12, wherein the front hinge comprises a U-shaped portion comprising a base and two legs extending from the base, wherein an axle is supported by the two legs, and
  wherein the front coupling portion comprises a through hole, the front coupling portion being at least partially arranged between the two legs and the axle is arranged through the through hole for hingedly supporting the panel support assembly.

15. The support mechanism according to claim 12, wherein the panel mounting portion, the front flexible portion and the front coupling portion are formed by a single element, the single element comprising a plate-like base part extending substantially perpendicular to the roof plane, wherein the panel mounting portion comprises a structure that results in a bending stiffness in the width direction in the panel mounting portion that is greater than a bending stiffness in the width direction for the front flexible portion.

16. The support mechanism according to claim 15 wherein the front flexible portion lacks the structure.

17. The support mechanism according to claim 12, wherein the rear mechanism comprises a first curve track and a second curve track and a first lever comprising a first pin and a second pin, wherein the first pin is arranged in and guided through the first curve track and the second pin is arranged in and guided through the second curve track, and
  wherein the first curve track and the second curve track are spaced apart in a direction perpendicular to the roof plane.

18. The support mechanism according to claim 12, wherein the guide rail comprises two substantially parallel walls extending substantially perpendicular to the roof plane and wherein the rear mechanism is coupled to only a single one of said parallel walls.

19. The support mechanism according to claim 12, wherein the front flexible portion is formed in an elongated element and wherein the front flexible portion comprises a thinned part of the elongated element.

20. The support mechanism according to claim 12, wherein the front flexible portion is formed in an elongated element and wherein the front flexible portion comprises a through hole through the elongated element.

21. The support mechanism according to claim 12, wherein the front mechanism comprises a parallel construction part, the parallel construction part extending between the front hinge and the guide rail, the parallel construction part comprising at least two mechanical couplings between the front hinge and the guide rail, and
  wherein the front flexible portion comprises a single mechanical coupling portion, the single mechanical coupling portion providing a single mechanical coupling between the panel mounting portion and said front hinge.

22. The support mechanism according to claim 12, wherein a first mechanical coupling comprises a first slide shoe and a second mechanical coupling comprises a second slide shoe and wherein the guide rail comprises a first guide channel and a second guide channel, the first slide shoe being moveably arranged in the first guide channel and the second slide shoe being arranged in the second guide channel.

23. The support mechanism according to claim 12, wherein the first guide channel is arranged in a first wall of the guide rail and the second guide channel is arranged in a second wall of the guide rail, the second wall being opposite the first wall.

\* \* \* \* \*